US008023069B2

(12) United States Patent
Furuichi et al.

(10) Patent No.: US 8,023,069 B2
(45) Date of Patent: Sep. 20, 2011

(54) LIQUID CRYSTAL DISPLAY DEVICE

(75) Inventors: Kazuteru Furuichi, Chounan (JP);
Masamitsu Miyata, Mobara (JP);
Hiroshi Nakamoto, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 399 days.

(21) Appl. No.: 12/265,799

(22) Filed: Nov. 6, 2008

(65) Prior Publication Data

US 2009/0115938 A1  May 7, 2009

(30) Foreign Application Priority Data

Nov. 7, 2007  (JP) .................................. 2007-289150

(51) Int. Cl.
*G02F 1/1335* (2006.01)
*G09F 13/04* (2006.01)

(52) U.S. Cl. ................ 349/65; 349/56; 349/57; 349/61; 362/97.1; 362/97.2

(58) Field of Classification Search .................... 349/65, 349/56, 57, 61, 62, 64, 95, 112, 200; 362/97.1, 362/97.2, 97.3
See application file for complete search history.

(56) References Cited

U.S. PATENT DOCUMENTS

| 6,247,826 | B1 * | 6/2001 | Funamoto et al. ............ 362/603 |
| 6,473,554 | B1 * | 10/2002 | Pelka et al. .................... 385/146 |
| 6,827,458 | B2 * | 12/2004 | Suga .............................. 362/609 |
| 6,992,736 | B2 * | 1/2006 | Saito et al. ....................... 349/58 |
| 7,226,196 | B2 * | 6/2007 | Parker et al. .................. 362/606 |
| 7,360,937 | B2 * | 4/2008 | Han et al. ....................... 362/608 |
| 2004/0124764 | A1 * | 7/2004 | Suzuki et al. ................. 313/498 |
| 2008/0151576 | A1 * | 6/2008 | Inditsky ........................ 362/615 |
| 2009/0115938 | A1 * | 5/2009 | Furuichi et al. ................. 349/65 |

FOREIGN PATENT DOCUMENTS

JP    2000-010083    1/2000
* cited by examiner

*Primary Examiner* — Brian M Healy
(74) *Attorney, Agent, or Firm* — Antonelli, Terry, Stout & Kraus, LLP.

(57) ABSTRACT

A light guiding plate is manufactured with high precision and in a short period of time in a backlight where light emitting diodes are provided on the side of the light guiding plate, even in the case where the light guiding plate is formed so as to have a spherical surface. In a liquid crystal display device having a backlight for illuminating a liquid crystal panel with light, LED's are provided in a light guiding plate in the backlight as a light emitting element, the light emitting portion of the light guiding plate is formed so as to have a spherical surface by applying heat and pressure to a resin in sheet form, and the light guiding plate is manufactured by fusing a light entering portion formed of a resin through injection molding with the light emitting portion.

16 Claims, 10 Drawing Sheets

LIQUID CRYSTAL DISPLAY DEVICE

The present application claims priority over Japanese Application JP2007-289150 filed on Nov. 7, 2007, the content of which is hereby incorporated into this application by reference.

BACKGROUND OF THE INVENTION (1) Field of the Invention

The present invention relates to a light source for a non-selfluminous display device, and in particular, to a liquid crystal display device having a light guiding plate and a backlight using LED's as a light source.

(2) Description of Related Art

In recent years, liquid crystal display devices have been widely in use as display devices. In particular, liquid crystal display devices are thin, light and consume little power, and thus used as display portions for portable apparatuses.

Liquid crystal display devices, however, are not selfluminous and thus require a means for illumination. Surface lighting units, referred to as backlight, are widely used as lighting units in general liquid crystal display devices. Cold cathode ray discharge tubes are used for light emitting elements for conventional backlights (also referred to as light sources), and in recent years, LED's (light emitting diodes) have also been used as light emitting elements.

Thin backlights include sidelight type backlights where light emitting elements are provided on the side. Sidelight type backlights are provided with a light guiding plate. Light guiding plates are made of a transparent resin or the like so that light which enters the light guiding plate from the light emitting element propagates through the light guiding plate. Light guiding plates are provided with reflective and light scattering members, such as trenches, protrusions or printed materials, and light that propagates through the light guiding plate is emitted toward the liquid crystal display device through the reflective and light scattering members.

In recent years, attempts have been made to form a liquid crystal display panel having a spherical surface, and the following "Patent Document 1," for example, discloses a liquid crystal display panel having a spherical surface. However, "Patent Document 1" does not describe the backlight used for liquid crystal display panels being in spherical form.

(Patent Document 1) Japanese Unexamined Patent Publication 2000-10083

SUMMARY OF THE INVENTION

Problem to Be Solved by the Invention

In order for the backlight to be formed so as to have a spherical surface matching the liquid crystal display panel having a spherical surface, it becomes necessary for the light guiding plate to be formed so as to have a spherical surface. However, it is difficult to mold light guiding plates manufactured through injection molding of a resin to have a spherical surface.

Means for Solving Problem

In order to solve the above described problem, a liquid crystal display device is provided with a display panel, a backlight for illuminating the display panel with light, a light emitting element provided with the above described backlight, a light guiding plate into which light enters from the light emitting element, and a light emitting element on the side of the light guiding plate, so that the light emitting portion of the light guiding plate is made of a resin and in sheet form, a light emitting portion having a curve is formed of a resin in sheet form by applying pressure, and the light guiding plate is formed through injection molding and pasted to the light entering portion.

EFFECTS OF THE INVENTION

It becomes possible to manufacture a light guiding plate having a curve and stable quality in a short period of time by forming the light emitting portion of the light guiding plate by processing a resin in thin sheet form.

EXPLANATION OF SYMBOLS

Figure 1:
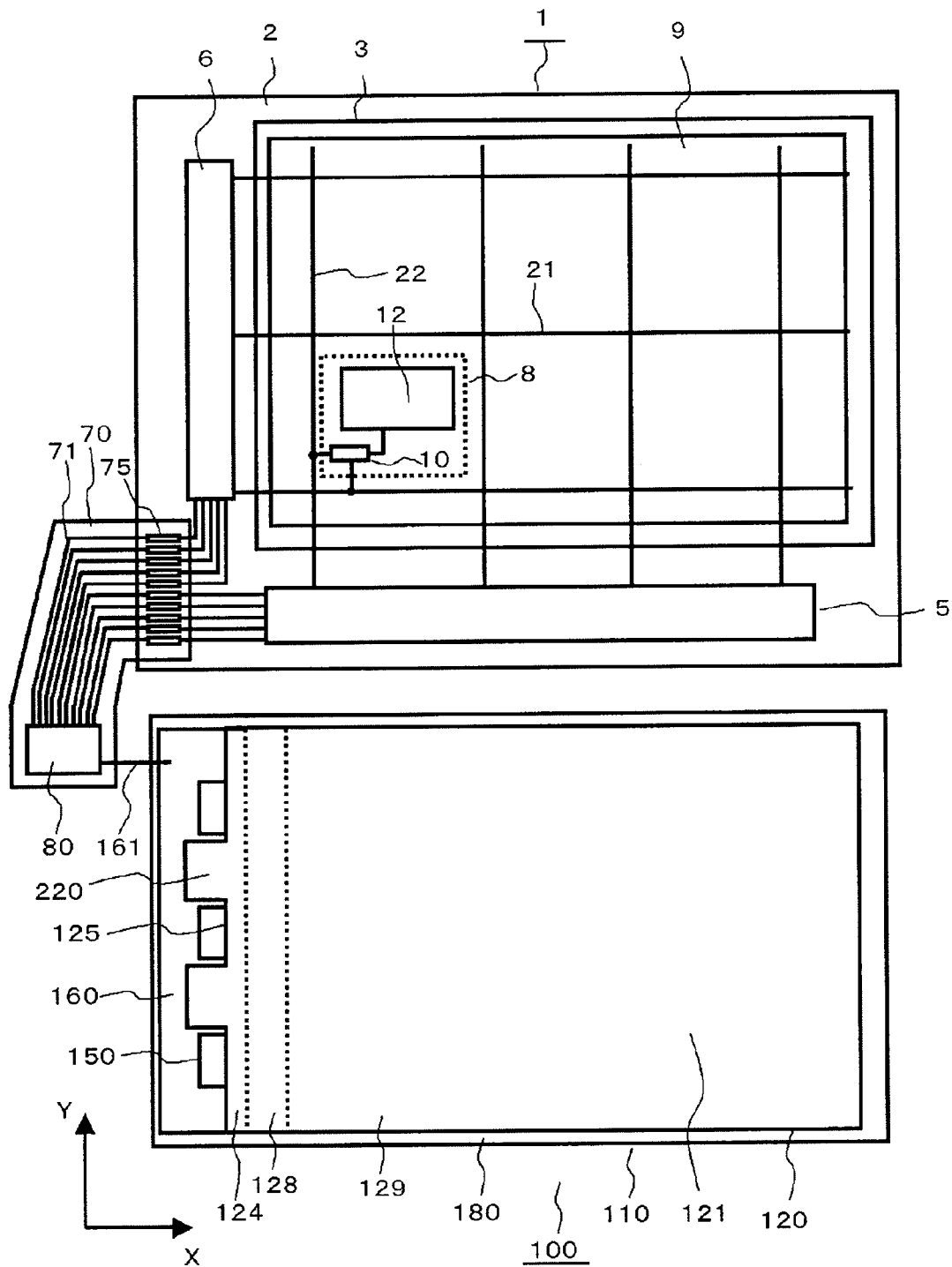
FIG. 1 is a block diagram schematically showing the configuration of the liquid crystal display device according to an embodiment of the present invention.

1 . . . liquid crystal panel
2 . . . TFT substrate
5 . . . drive circuit
6 . . . drive circuit
8 . . . pixel portion
9 . . . display region
10 . . . switching element
12 . . . pixel electrode
21 . . . gate wire (scanning signal line)
22 . . . video signal line
70 . . . FPC
71 . . . wire
75 . . . terminal
80 . . . control circuit
110 . . . backlight
112 . . . prism sheet
113 . . . prism sheet
114 . . . diffusing plate
115 . . . reflective sheet
116 . . . light blocking frame
120 . . . light guiding plate
121 . . . upper surface
122 . . . lower surface
125 . . . entrance surface
126 . . . trench
128 . . . lens in teardrop form
129 . . . inclined surface
131 . . . light beam in direction of light emission
150 . . . LED
151 . . . LED chip
152 . . . wire
153 . . . chip terminal
156 . . . fluorescent light emitting portion
158 . . . anode electrode
159 . . . cathode electrode
160 . . . flexible substrate
180 . . . mold
220 . . . protrusion of light guiding plate

DETAILED DESCRIPTION OF THE INVENTION

Best Mode for Carrying Out the Invention

In a liquid crystal display device having a liquid crystal panel and a surface lighting unit for illuminating the liquid crystal panel with light, a light guiding plate having a light emitting surface and a bottom surface facing the light emitting surface is provided in the surface lighting unit. In addition, the light guiding plate is provided with a side that crosses the light emitting surface or the bottom surface, and a number of LED's are provided along the first side of the light guiding plate so that the first side becomes an entrance surface of the light guiding plate when light from the LED's enters through the first side. Light that enters the light guiding plate is directed toward the light emitting surface by a scattering member provided on the bottom surface of the light guiding plate, and emitted through the light emitting surface. An inclined portion is provided on the light guiding plate from the light entering surface to the light emitting surface. The inclined portion is formed through injection and fused to the light emitting surface. The light emitting surface is gained by creating a curve on a resin in sheet form by applying heat and pressure, and the light guiding plate is formed at the same time by transferring the form of a die to a resin in sheet form.

First Embodiment

FIG. 1 is a plan diagram showing the liquid crystal display device 100 according to the present invention. The liquid crystal display device 100 is formed of a liquid crystal panel 1, a backlight 110 and a control circuit 80. Signals required for display on the liquid crystal display device 100 and a power supply voltage are supplied from the control circuit 80. The control circuit 80 is mounted on a flexible substrate 70, and signals are transmitted to the liquid crystal panel 1 via wires 71 and terminals 75.

The backlight 110 is formed of a light guiding plate 120, LED's 150 and a container case 180. The backlight 110 is provided in order to illuminate the liquid crystal panel 1 with light. The liquid crystal panel 1 controls the amount of light emitted from the backlight 110 which is transmitted or reflected for display. Here, the backlight 110 is provided so as to overlap with the liquid crystal panel 1 on the rear surface side or the front surface side as seen from the viewer side, but shown side-by-side with the liquid crystal in FIG. 1 for the sake of simplicity.

The light guiding plate 120 is approximately in rectangular form, and a number of LED's 150 are provided on the side. The symbol 160 indicates a flexible substrate for electrically connecting the LED's 150. The flexible substrate 160 and the control circuit 80 are electrically connected with a wire 161.

The side 125 on which the LED's 150 are provided is referred to as entrance surface or light entering surface, and light enters the light guiding plate 120 through the entrance surface 125. In addition, light that enters through the entrance surface 125 is emitted from the light emitting surface 121. An inclined portion 128 is formed between the entrance surface 125 and the light emitting surface 121 so that light is guided from the inclined surface 125 to the light emitting surface 121. The entrance surface 125 and the inclined surface 128 form a light entering portion 124, so that light from the LED's 150 is efficiently conveyed to the light emitting surface. Here, the light entering portion 124 is described in detail. In addition, the light emitting surface 121 side of the light guiding plate 120 is also referred to as light emitting portion 129, and is meant to be the opposite of light entering portion 124.

Next, the liquid crystal panel 1 is described. The liquid crystal panel 1 has two substrates: a TFT substrate 2 and a color filter substrate 3, and a liquid crystal composite is sandwiched between the two overlapping substrates. Pixel portions 8 are provided on the TFT substrate 2, and a pixel electrode 12 is provided in each pixel portion 8. Here, the liquid crystal panel 1 has a great number of pixel portions 8 in a matrix, but FIG. 1 shows only one pixel portion 8 so as not to make the figure too complicated. The pixel portions arranged in a matrix form a display region 9, so that each pixel portion 8 works as a pixel for displaying an image, and an image is displayed in the display region 9.

In FIG. 1, gate signal lines (also referred to as scanning lines) 21 are provided so as to extend in the direction x and be aligned in the direction y, and drain signal lines (also referred to as video signal lines) are provided so as to extend in the direction y and be aligned in the direction x, so that the gate signal lines 21 and the drain signal lines 22 cross each other. In addition, the pixel portions 8 are formed in regions surrounded by gate signal lines 21 and drain signal lines 22.

A switching element 10 is provided in each pixel portion 8. A control signal is supplied from the gate signal line 21 so that switching ON/OFF of the switching element 10 is controlled.

When the switching element 10 becomes of an ON state, the video signal transmitted via the drain signal line 22 is supplied to the pixel electrode 12.

Drain signal lines 22 are connected to a drive circuit 5 and video signals are outputted from the drive circuit 5. The gate signal lines 21 are connected to a drive circuit and control signals are outputted from the drive circuit 6. Here, the gate signal lines 21, the drain signal lines 22, the drive circuit 5 and the drive circuit 6 are formed on the same TFT substrate 2. It is also possible to form the control circuit 80 on one semiconductor chip in addition to the drive circuit 5 and the drive circuit 6.

Figure 2A:
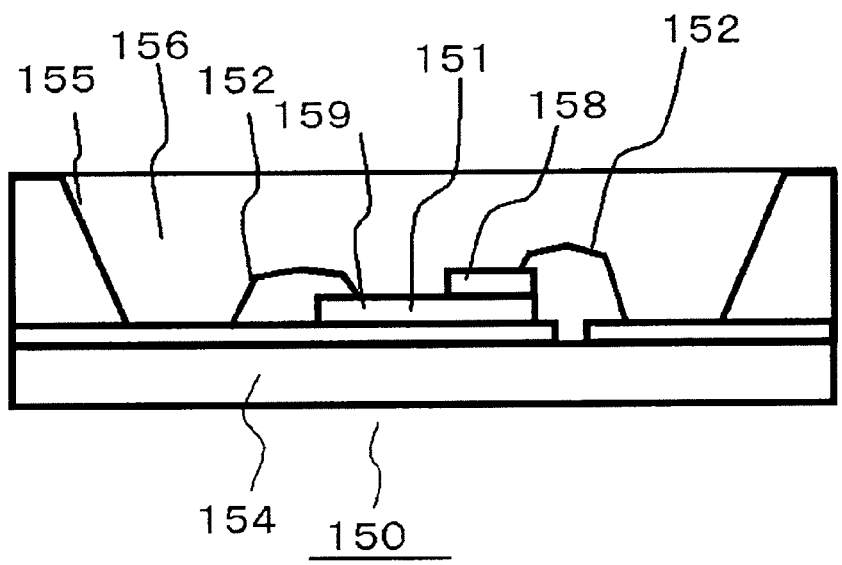
FIGS. 2(a) and 2(b) are schematic diagrams showing a light emitting diode in the liquid crystal display device according to an embodiment of the present invention.
Figure 2B:
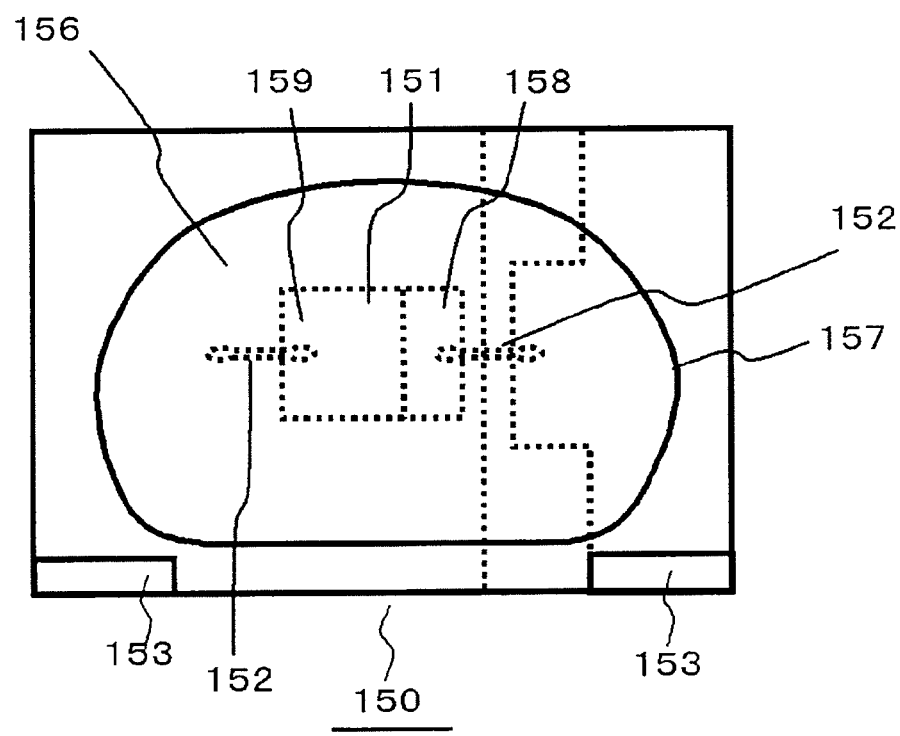

Next, FIGS. 2(a) and 2(b) are schematic diagrams showing an LED 150, which is a light emitting element. FIG. 2(a) is a schematic cross sectional diagram, and FIG. 2(b) is a front diagram as viewed from the side of light emission.

The LED 150 has a structure where an LED chip 151, which is a light emitting portion, is mounted on a chip substrate 154. The LED chip 151 has a pn junction, and when a voltage is applied across the pn junction, light of a certain wavelength is emitted. A p electrode (anode) 158 and an n electrode (cathode) 159 are respectively provided in the p type semiconductor layer and the n type semiconductor layer, which form the pn junction.

Wires 152 are connected to the p type electrode 158 and the n type electrode 159. The wires 152 electrically connect chip terminals 153 provided for external connection of the LED 150 to the p electrode 158 and the n electrode 159.

In some cases, a fluorescent light emitting portion 156 is provided on the emission surface side of the LED chip 151. The fluorescent light emitting portion 156 functions to convert the wavelength of light emitted from the LED chip 151. The symbol 155 indicates a reflective portion from which light is reflected to the front. A light emitting portion 157 through which light is emitted is formed on the front surface side of the LED 150.

Figure 3A:
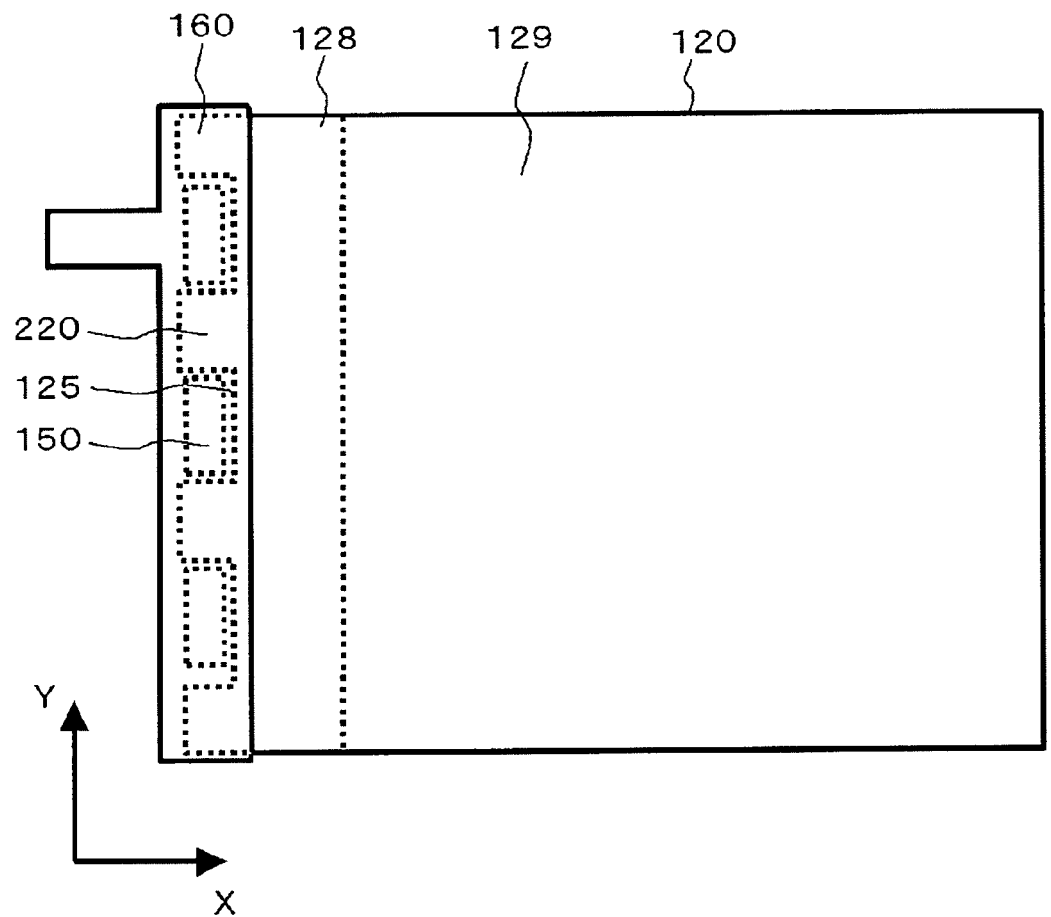
FIGS. 3(a) and 3(b) are schematic diagrams showing the light guiding plate of the liquid crystal display device according to an embodiment of the present invention.
Figure 3B:
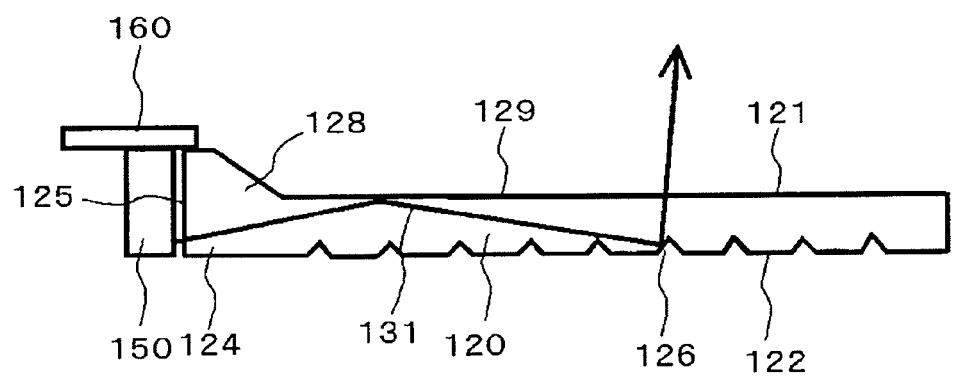

FIG. 3(a) is a schematic plan diagram and FIG. 3(b) a schematic side diagram showing a light guiding plate 120. The light guiding plate 120 is approximately rectangular, as shown in FIG. 3(a), and has an upper surface (also referred to as light emitting surface) 121 and a lower surface 122, as shown in FIG. 3(b). The light guiding plate 120 is formed of a material which transmits light, such as an acryl resin, and has a thickness of 1.0 mm to 0.1 mm.

As shown in FIG. 3(b), the cross section of the light guiding plate 120 is approximately rectangular, and an inclined portion 128 is formed from the entrance surface 125 to the light emitting surface 121. The inclined portion 128 is effective in the case where the thickness of the LED's 150 is greater than the light emitting surface 121 of the light guiding plate 120.

FIGS. 3(a) and 3(b) show the positional relationship between the light guiding plate 120, the LED's 150 and the flexible substrate 160. An entrance surface 125 is provided on at least one side of the light guiding plate 120, and a number of LED's 150 are provided in the vicinity of the entrance surface 125. The LED's 150 are aligned along the entrance surface 125 on the lower side of the flexible substrate 160.

An adhesive sheet (not shown) is provided on the light guiding plate 120 side of the flexible substrate 160, so that the flexible substrate 160 can be pasted and secured to the light guiding plate 120, and thus, the LED's 150 are positioned relative to the entrance surface 125.

Protrusions 220 are provided in order to make the area through which the flexible substrate 160 and the light guiding plate 120 adhere to each other through an adhesive sheet large. Protrusions 220 are provided so as to sandwich the LED's 150 on the light emitting surface 125 side of the light guiding plate 120, and these protrusions 220 and the flexible substrate 160 adhere to each other, and thus, it is possible to adjust the position of the LED's 150 relative to the light guiding plate 120 with high precision.

Next, light 131 emitted from the LED's 150 is described in reference to FIG. 3(b). Light 131 emitted from the LED's 150 enters the light guiding plate 120 through the entrance surface 125. The index of refraction of the light guiding plate 120 is greater than that of the air, and therefore, light that reaches the entrance surface 125 at an angle which is greater than a certain angle relative to the direction perpendicular to the entrance surface 125 is reflected, while light which reaches the entrance surface 125 at a smaller angle enters the light guiding plate 120.

The upper surface 121 and lower surface 122 of the light guiding plate 120 make approximately a right angle with the entrance surface 125, and light that enters the light guiding plate 120 progresses through the light guiding plate 120 while repeating total reflection from the upper surface 121 and lower surface 122 of the light guiding plate 120. Trenches 126 in V shape are provided in the lower surface 22 as reflective portions. Part of light that progresses through the light guiding plate 120 is reflected from trenches 126 provided on the lower surface 122 toward the upper surface 121, and is emitted through the upper surface 121. Here, though trenches 126 in V shape are given as an example of reflective portions, any type of reflective portion can be used, as long as it turns light that progresses through the light guiding plate toward the upper surface 11, and it is also possible to use white dots provided through printing or the like.

Figure 4A:
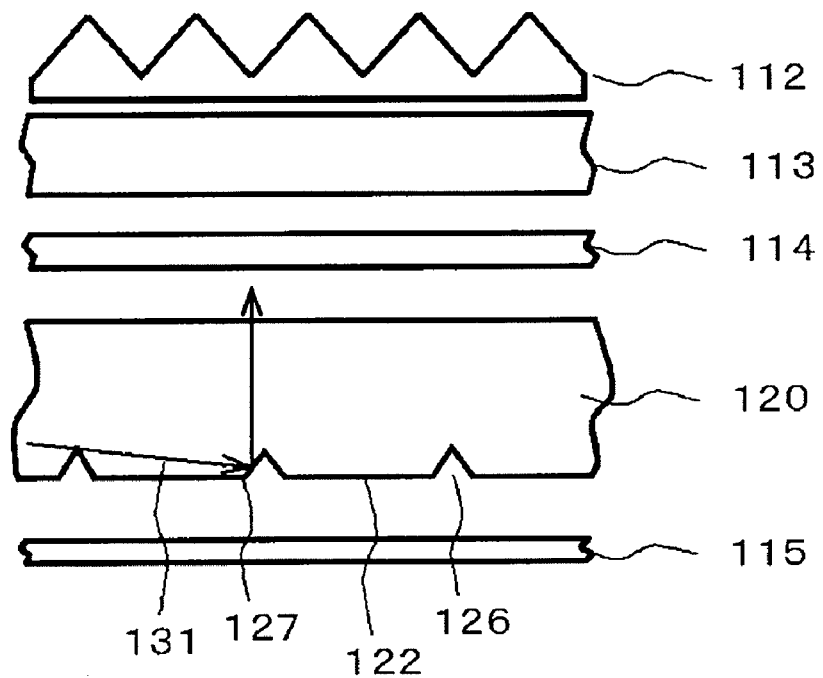
FIGS. 4(a) and 4(b) are cross sectional diagrams schematically showing the light guiding plate of the liquid crystal display device according to an embodiment of the present invention.
Figure 4B:
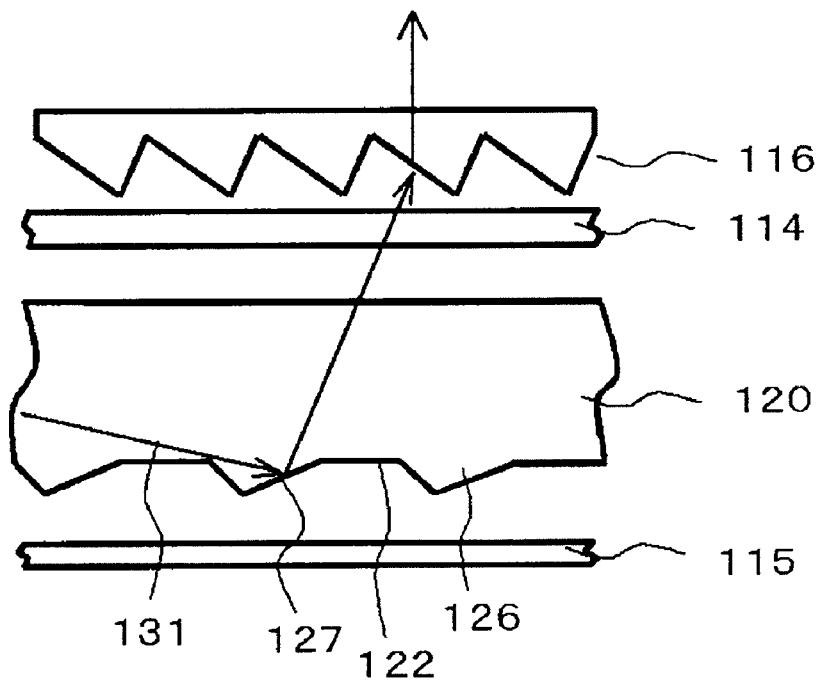

Next, light reflected from trenches 126 is described in reference to FIGS. 4(a) and 4(b). FIG. 4(a) shows a case where the trenches 126 are concave, and FIG. 4(b) shows a case where the trenches 126 are convex. The trenches 126 have reflective surfaces (also referred to as inclined surfaces) 127, and the reflective surfaces 127 have an angle of 1 degree to 35 degrees relative to the lower surface 122. Light is reflected from the reflective surfaces 127 toward the upper surface 121 of the light guiding plate 120. It is possible to make the angle of light relative to the upper surface 121 the angle at which light can be emitted through the upper surface 121 when light is reflected from the reflective surfaces 127. That is to say, light repeats total reflection inside the light guiding plate 120 as described above, and the reflective surfaces 127 allow light to progress at such an angle that it is possible for light to be emitted from the light guiding plate 120.

As shown in FIG. 4(a), prism sheets 112 and 113 are provided on the upper surface 121 of the light guiding plate 120 so that the direction of light emitted from the light guiding plate 120 can be controlled. Here, in FIG. 4(a), the prism sheets 112 and 113 are arranged so that the ridgelines of triangular prisms cross. Therefore, it is possible for the prism sheet 113 to refract light emitted from the light guiding plate 120 progresses in the lateral direction, so that light is directed inward (toward the liquid crystal panel). In addition, the symbol 114 indicates a diffusing plate and the symbol 115 indicates a reflective sheet.

FIG. 4(b) shows a case where an asymmetric prism sheet is used. Light reflected from the reflective surfaces 127 makes an obtuse angle relative to the direction perpendicular to the upper surface 121, and is emitted from the upper surface 121 so as to spread outward (right side in the figure). An asymmetric prism sheet 116 is provided on top of the light guiding plate 120 so that light directed outward is refracted toward the liquid crystal panel (not shown).

Figure 5:
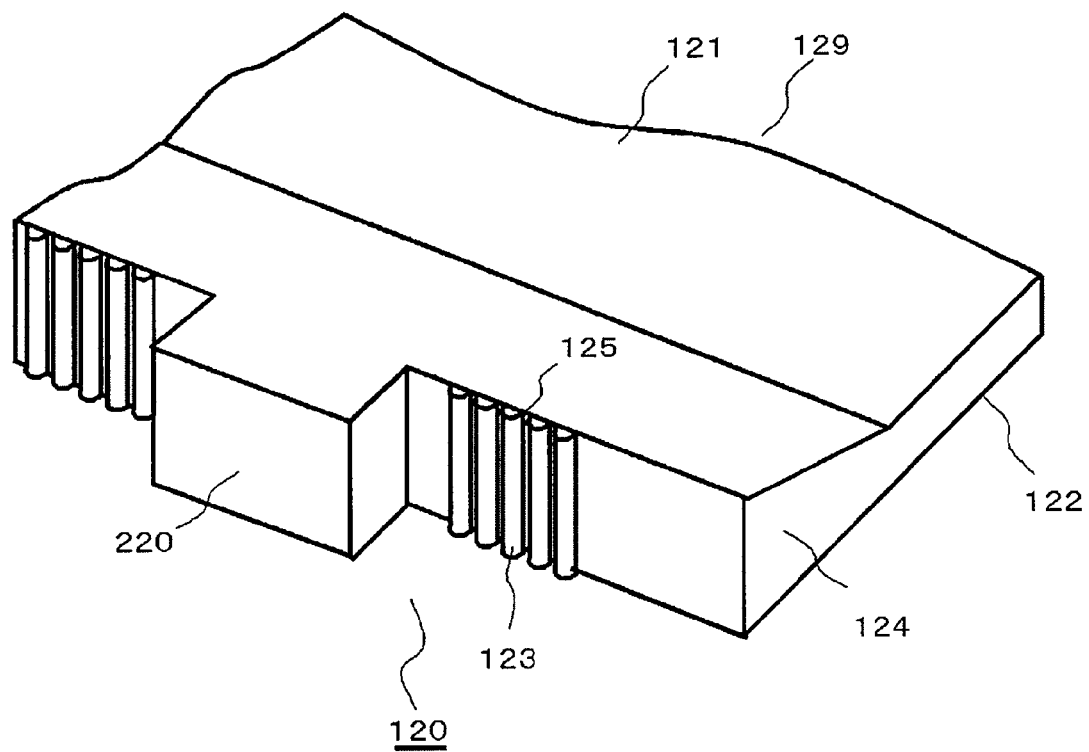
FIG. 5 is a schematic cross sectional diagram showing the light guiding plate of the liquid crystal display device in the vicinity of the light entering surface according to an embodiment of the present invention.

FIG. 5 is a perspective diagram showing the light guiding plate 120 in the vicinity of the light entering surface 125. Lenses 123 are provided on the entrance surface 125 of the light guiding plate 120. The lenses 123 work to scatter light that enters through the light entering surface 125. Light that enters through the light entering surface 125 is guided to the light emitting surface 121 through the inclined portion 128. Protrusions 220 are formed between adjacent lenses 123 so as to protrude from the light entering surface 125. The protrusions 220, the light entering surface 125, the lenses 123, the inclined surface 128 and the like form the light entering portion 124.

In the case where the light guiding plate 121 is thin, the thickness of the LED's 150 is greater than the distance between the upper surface 121 and the lower surface 122. Therefore, the thickness of the light guiding plate 120 is increased in the light entering surface 125 and the inclined surface 128 is provided, and thus, light is guided toward the upper surface 121.

Light is emitted from the upper surface 121 toward the liquid crystal panel, and the portion through which light directed toward the liquid crystal panel from the light guiding plate 120 is emitted is referred to as light emitting portion 129. The thickness of the light guiding plate 120 in the light emitting portion 129 has been becoming smaller because of reduction in the thickness of liquid crystal panels, and when the distance between the upper surface 121 and the lower surface 122 is 1 mm or less, manufacture through injection molding is difficult.

Figure 6:
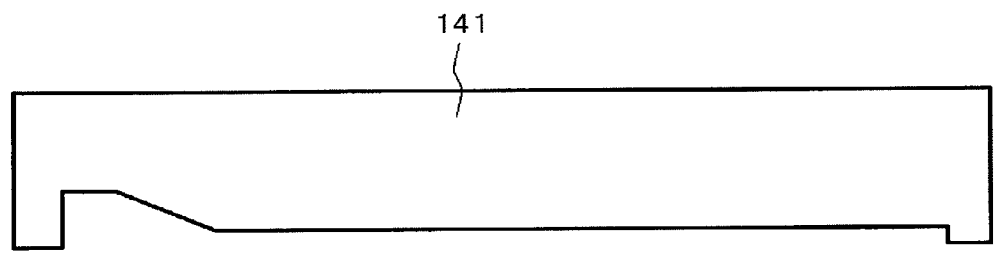
FIG. 6 is a schematic cross sectional diagram showing a die for molding the light guiding plate of the liquid crystal display device according to an embodiment of the present invention.

Thus, the light emitting portion 129 is manufactured using a resin in sheet form. FIG. 6 shows how a resin 170 in sheet form is placed on a die 140. The structures required for the light guiding plate 120, such as the above described trenches 126, are not yet formed in the resin 170 in sheet form, before it is formed using a die.

Various types of synthetic resins in sheet form, such as acryl resins, ABS resins, SAN resins, polycarbonate resins and the like, can be used as the resin 170 in sheet form.

Figure 7:
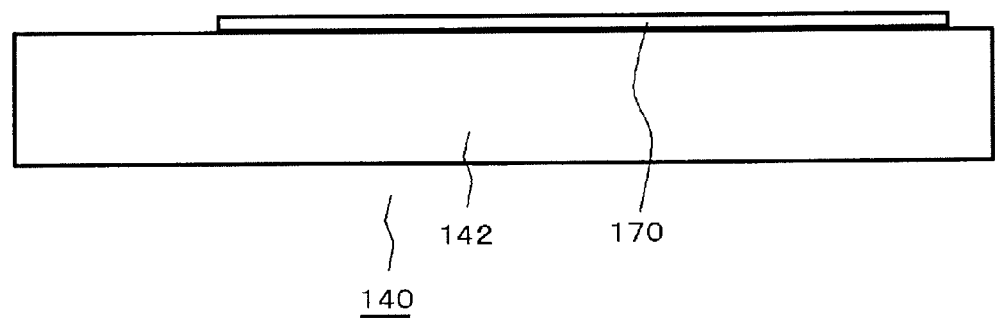
FIG. 7 is a schematic cross sectional diagram showing a die for molding the light guiding plate of the liquid crystal display device according to an embodiment of the present invention.

As shown in FIG. 7, the resin 170 in sheet form is sandwiched between the lower portion 142 of the die and the upper portion 141 of the die, and heat and pressure are applied, and thus, the resin 170 in sheet form is molded and trenches 126 and the like are created in the light guiding plate 120.

At this time, the resin 170 in sheet form is not placed in the light entering portion 124. As described above, the light entering portion 124 has a complex form and includes protrusions 220, lenses 123, the inclined surface 128 and the like, and a constant thickness, and therefore, the light entering portion 124 is formed through injection molding of a resin.

Figure 8:
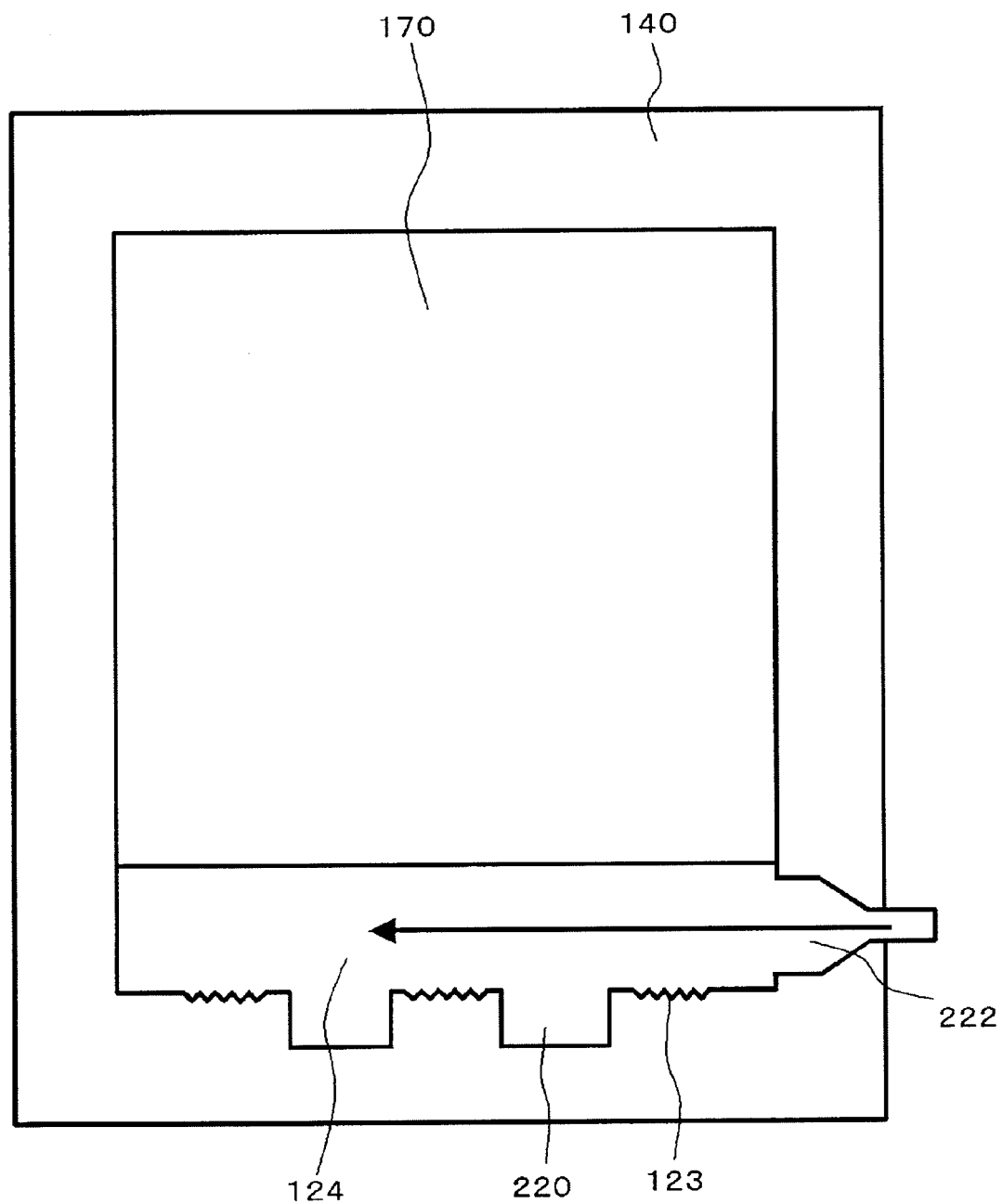
FIG. 8 is a schematic plan diagram showing how a resin is injected and molded into the light guiding plate of the liquid crystal display device according to an embodiment of the present invention.

FIG. 8 shows how a resin is molded through injection. A gate 222 is formed on the side of the light guiding plate 120 so as to make contact with the light entering portion 124. A resin is injected in the light entering portion 124 through the gate 222 in the direction indicated by the arrow. The lenses 123 and the protrusions 220 provided in the light entering portion 124 are uniformly filled in with the resin.

Figure 9:
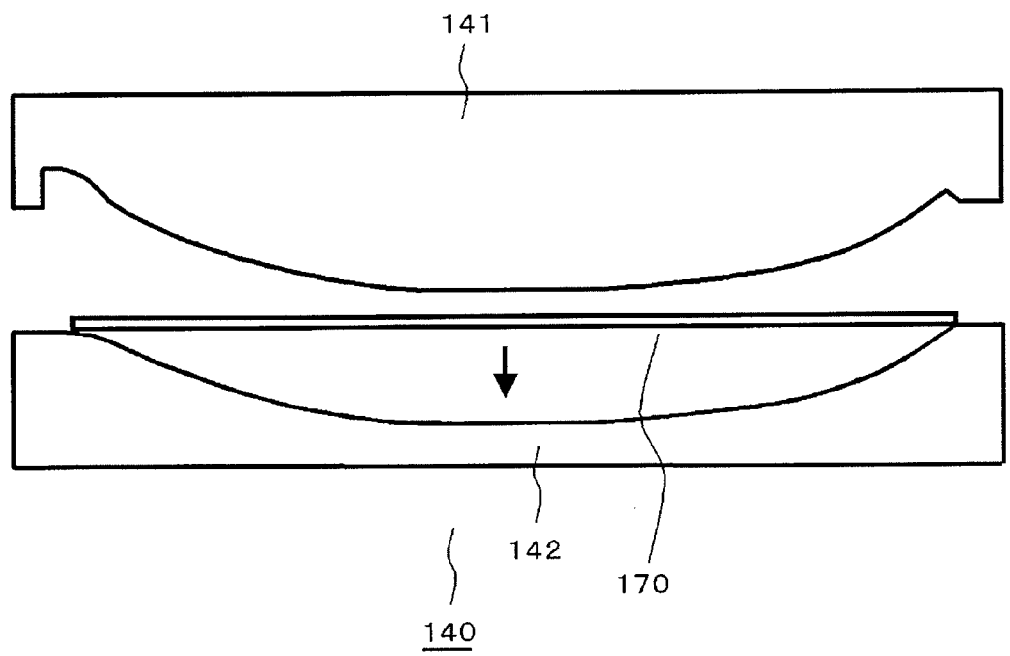
FIG. 9 is a schematic cross sectional diagram showing a die for molding the light guiding plate of the liquid crystal display device according to an embodiment of the present invention.
Figure 10:
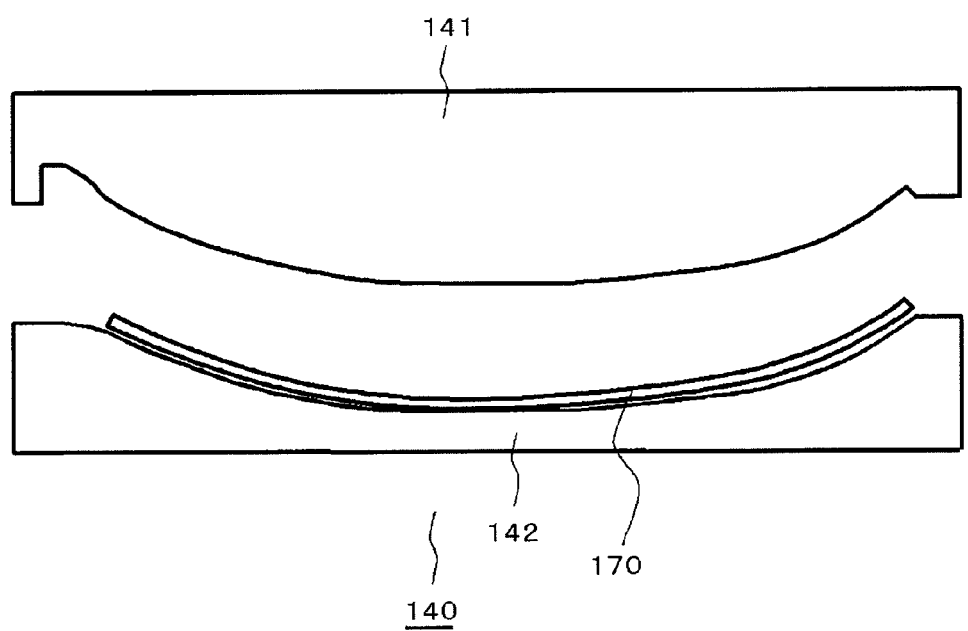
FIG. 10 is a schematic cross sectional diagram showing a die for molding the light guiding plate of the liquid crystal display device according to an embodiment of the present invention.
Figure 11:
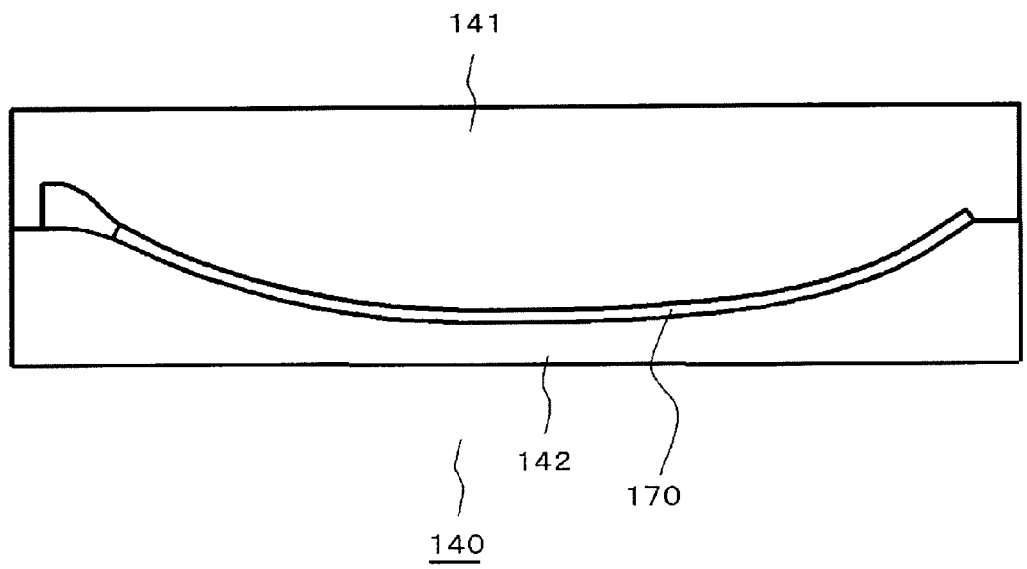
FIG. 11 is a schematic cross sectional diagram showing a die for molding the light guiding plate of the liquid crystal display device according to an embodiment of the present invention.

Next, a manufacturing method for the light guiding plate 120 where the light emitting portion 129 is formed of a curve is described in reference to FIGS. 9 to 11. As shown in FIG. 9, an upper die 141 and a die 142, both having a curve, are prepared as shown in FIG. 9, and a resin 170 in sheet form is placed between the upper die 141 and the die 142.

In the case where the resin 170 in sheet form is flexible, it slacks under its own weight in the direction of the arrow, and the resin 170 in sheet form bends following the curve of the lower die 142, as shown in FIG. 10.

Next, as shown in FIG. 11, the upper die 141 is pressed against the lower die 142, and heat and pressure are applied, so that the resin 170 in sheet form is molded and trenches 126 created in the light guiding plate 120. In addition, the resin 170 in sheet form curves along the surface of the die.

Heat and pressure are applied to the die 140 so that a curve is formed, and after that, the light entering portion 124 is formed through injection molding of a resin. The light guiding plate 120 having such a curve is effective as a light guiding plate 120 for a backlight in the case where the liquid crystal panel has a curve.

Figure 12:
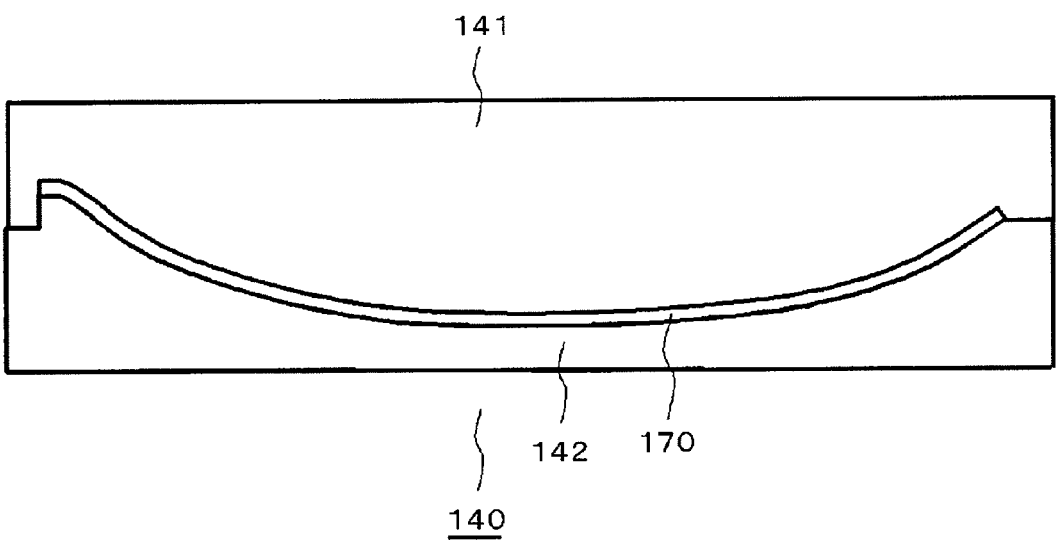
FIG. 12 is a schematic cross sectional diagram showing a die for molding the light guiding plate of the liquid crystal display device according to an embodiment of the present invention.
Figure 13:
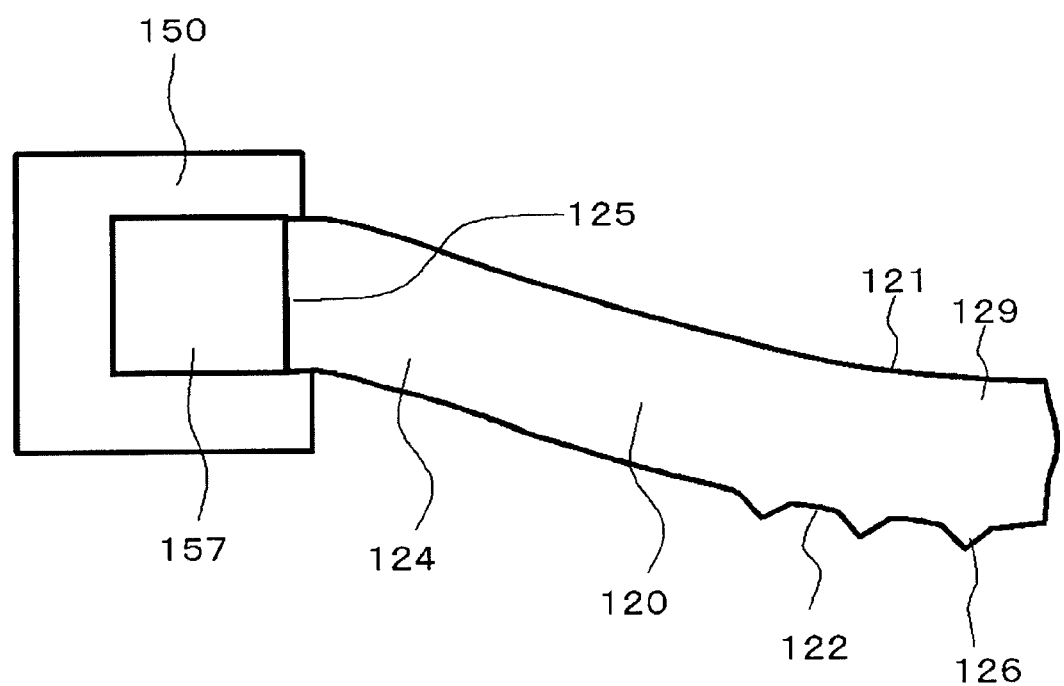
FIG. 13 is a schematic cross sectional diagram showing the light entering portion of the light guiding plate of the liquid crystal display device according to an embodiment of the present invention.

Next, FIG. 12 shows a die 140 which is used in the case where the light entering portion 124 is curved in S shape. In addition, FIG. 13 shows a light entering portion 124 curved in S shape. The light entering portion 124 of the light guiding plate 120 can be formed with a curve in S shape, as shown in FIG. 13, using the die 140 shown in FIG. 12. In this case, the resin 170 in sheet form is placed also in the light entering portion 124 so as to make it possible to make the thickness of the light guiding plate formed of the resin 170 in sheet form constant from the light entering portion 124 to the light emitting portion 129.

As shown in FIG. 13, the thickness of the light guiding plate 120 is made the same as the width of the light emitting portion 157 of the LED 150 in the longitudinal direction, and thus, it becomes possible for light emitted from the LED 150 to enter and propagate through the light guiding plate 120 with high efficiency. In addition, it is also possible to make the top and the bottom of the light emitting portion 157 of the LED 150 overlap with the light entering surfaces 125 of the light guiding plate 120, so that the light guiding plate 120 is engaged with the LED 150.

The invention claimed is:

1. A liquid crystal display device, comprising:
    a liquid crystal panel;
    a backlight for illuminating the liquid crystal panel with light;
    a light emitting element provided in said backlight;
    a light guiding plate into which light from said light emitting element enters; and
    a substrate on which said light emitting element is mounted, characterized in that
    said light guiding plate comprises:
        a light entering portion facing a light emitting surface of said light emitting element into which light from the light emitting element enters; and
        a light emitting portion from which said light that enters is emitted, and
    said light emitting portion is formed as a curve,
    said light entering portion is fused with said light emitting portion; and
    a thickness of a side of said light emitting element is greater than a thickness of said light emitting portion of said light guiding plate.

2. The liquid crystal display device according to claim 1, characterized in that said light entering portion is provided with a lens through which light from the light emitting element diffuses so as to enter the light guiding plate.

3. The liquid crystal display device according to claim 1, characterized in that said light entering portion is fused with said light emitting portion by injecting a molten resin in said light emitting portion in sheet form.

4. A liquid crystal display device, comprising:
    a liquid crystal panel;
    a backlight for illuminating the liquid crystal panel with light;
    a light guiding plate provided on the backlight;

a number of light emitting diodes provided along a side of the light guiding plate;

a lens provided on an entrance surface through which light from said light emitting diodes enters;

a protrusion which protrudes from a side of the light guiding plate with said lens in between; and a light emitting surface of the light guiding plate having a smaller thickness than a thickness said light emitting diodes, characterized in that said entrance surface and said protrusion of the light guiding plate are formed through injection molding and used as a light entering portion, said light emitting surface is formed as a curve, said light entering portion and said light emitting surface are fused, and the thickness of said light emitting diodes is greater than the thickness of said light emitting surface of the light guiding plate.

5. The liquid crystal display device according to claim 4, characterized in that the lens provided on said entrance surface is located between two adjacent protrusions on the light guiding plate.

6. The liquid crystal display device according to claim 4, characterized in that an inclined surface is provided from said entrance surface to said light emitting surface.

7. The liquid crystal display device according to claim 4, characterized in that said light entering portion is fused with said light emitting surface by injecting a molten resin into said light emitting surface in sheet form.

8. A liquid crystal display device, comprising a liquid crystal panel and a surface lighting unit for illuminating the liquid crystal panel with light, characterized in that a light guiding plate having a light emitting surface and a bottom surface facing the light emitting surface is provided in the surface lighting unit, a side which crosses the light emitting surface and the bottom surface is provided on the light guiding plate, a number of LED's are provided along a first side of the light guiding plate, the first side is used as an entrance surface of the light guiding plate when light from the LED's enters through the first side, light that enters the light guiding plate is directed toward the light emitting surface through a scattering member provided on the bottom surface of the light guiding plate so as to be emitted through the light emitting surface, the thickness of said LED's is greater than the space between said light emitting surface and the bottom surface, an inclined portion is provided between said entrance surface and said light emitting surface, said light emitting surface is formed as a curve, said inclined portion is fused with said light emitting surface to form the light guiding plate, and said light emitting surface of the light guiding plate is a sheet of resin having a thickness which is smaller than the thickness of said LED's.

9. The liquid crystal display device according to claim 8, characterized in that a lens in columnar form is provided on said entrance surface.

10. The liquid crystal display device according to claim 8, characterized in that said inclined portion is pasted to said light emitting surface by joining a molten resin with said light emitting surface in sheet form.

11. The liquid crystal display device according to claim 1, characterized in that the thickness of said light emitting portion of said light guiding plate is no greater than 1 mm.

12. The liquid crystal display device according to claim 1, characterized in that said light entering portion of said light guiding plate has a thickness greater than the thickness of said light emitting portion which is a preformed sheet, and said light entering portion includes an inclined portion of gradually reduced thickness in a direction toward said light emitting portion of said light guiding plate.

13. The liquid crystal display device according to claim 4, characterized in that the thickness of said light emitting surface of the light guiding plate is no greater than 1 mm.

14. The liquid crystal display device according to claim 4, characterized in that said light entering portion of the light guiding plate has a thickness greater than the thickness of said light emitting surface which is a preformed sheet and said light entering portion includes an inclined portion of gradually reduced thickness in a direction toward said light emitting surface of the light guide plate.

15. The liquid crystal display device according to claim 8, characterized in that the thickness of said light emitting surface of said light guiding plate is no greater than 1 mm.

16. The liquid crystal display device according to claim 8, characterized in that said entrance surface and said inclined portion adjacent said entrance surface have a thickness greater than a thickness of said light emitting surface which is a preformed sheet of resin, and said inclined portion has a gradually reduced thickness in a direction toward said light emitting surface.

* * * * *